United States Patent [19]

Knotek et al.

[11] Patent Number: 4,546,040

[45] Date of Patent: Oct. 8, 1985

[54] CIGARETTE FILTER AND METHOD OF MANUFACTURE

[75] Inventors: Lubomír Knotek, Svit; Jozef Peciar, Nitra; Ivan Mitterpach, Poprad; Jozef Hudák, Batizovce; Ján Simo; Ján Badura, both of Poprad; Viliam Beseda, Bratislava; Frantisek Mihály, Bratislava; Alexander Gregor, Bratislava; Ján Klisky, Bratislava, all of Czechoslovakia

[73] Assignee: Vyskummy ustav chemickych claken, Svit, Czechoslovakia

[21] Appl. No.: 618,998

[22] Filed: Jun. 11, 1984

[30] Foreign Application Priority Data

Jun. 9, 1983 [CS] Czechoslovakia .................... 4146-83

[51] Int. Cl.$^4$ .......................... A24C 5/50; B32B 3/00; D02G 3/00
[52] U.S. Cl. .................................... 428/370; 131/332; 428/398; 428/400
[58] Field of Search ............... 428/369, 370, 398, 400, 428/397; 131/332, 341, 345; 210/500.2

[56] References Cited

U.S. PATENT DOCUMENTS

| | | | |
|---|---|---|---|
| 3,144,025 | 8/1964 | Erlich | 131/341 X |
| 3,232,294 | 2/1966 | Orsino et al. | 131/332 |
| 3,329,544 | 7/1967 | Smith et al. | 131/332 X |
| 3,505,164 | 4/1970 | Oppenlander | 428/370 |
| 3,677,881 | 7/1972 | Riordon | 428/398 |
| 3,769,148 | 10/1973 | Barlow | 428/296 X |
| 3,957,936 | 5/1976 | Lauchenauer | 428/400 X |
| 4,055,696 | 10/1977 | Kamada et al. | 428/398 |
| 4,173,504 | 11/1979 | Tomioka et al. | 131/341 X |
| 4,405,688 | 9/1983 | Lowery | 428/398 |
| 4,485,141 | 11/1984 | Fujimura et al. | 428/400 X |

*Primary Examiner*—Lorraine T. Kendell

[57] ABSTRACT

Cigarette filters with improved efficiency and reduced resistance to gas flow, and a method of preparing them, are disclosed. The filters are made from crimped multicomponent polypropylene polymers having microfissures on their surfaces and micropores on their cross-sections, with 5 to 7 crimps per centimeter of length, and a unit fineness of 5 to 7 dtex. The elementary fibers in the bundle have different centers of gravity, and are present in ratios of from 1:3 to 3:1 by weight. The fibers are prepared by separate melting and thermal treatment of each polypropylene polymer component, having LVI values ranging from 100 to 200 ml/g, at temperatures ranging from 230 to 330 degrees C. The difference in LVI values between the components is from 30 to 50 ml/g, and at least one of the components has a 5–20% high molecular weight fraction, by weight, with an LVI of from 400 to 450 ml/g. Each component is homogenized separately, after which they are mixed from a nonhomogeneous flow of melts and extruded into a bundle through 3000 to 10,000 orifices in a spinneret. The bundle, or sliver, is treated with water, relaxed and fixed at a temperature of 70 to 140 degrees C., wrapped with paper, and cut into filters.

1 Claim, No Drawings

CIGARETTE FILTER AND METHOD OF MANUFACTURE

BACKGROUND OF THE INVENTION

This invention relates to cigarette filters for tobacco smoke, and to a method for its manufacture. The filter captures gaseous, liquid, and solid waste produced by burning tobacco.

Single component fibrous cigarette filters are known in the art. These are made from viscose or cellulose acetate fibers; from natural fibers such as paper; and from polyethylene, polypropylene, or polyvinyl chloride fibers. However, these filters suffer from a number of disadvantages.

The preparation of viscose filters is expensive. The conventional production of a carded viscose sliver from the viscose staple requires a large capital investment in machinery, many labourers, and many seperate manufacturing operations. Viscose filters are heavy, they demonstrate a high resistance to the flow of gases, and they are low in filter whiteness. Chemical treatment with hardening agents is required, and the viscose fibers contain undesireable residual chemical components, such as sulphur. In addition, viscous fibers constitute a raw material for the textile industry. These fibers often cannot be replaced by synthetic fibers, despite the traditionally high cost of cellulose-based viscous fibers.

Like viscose filters, single component polypropylene or polyethylene filters are heavy and resistant to the flow of gases. The efficiency of these filters is relatively low when compared with cellulose acetate filters and with the filters of the present invention.

At present, a sliver of cellulose acetate fiber is generally considered the most suitable material for the production of cigarette filters. However, filters of this type contract during smoking, with a loss in filter volume, due to the warmth of the tobacco smoke. As it contracts, the filter shrinks from the wall of the paper wrapper, further reducing filter efficiency. In addition, the deformed filter is unappealing aesthetically. Like viscose filters, they require treatment with hardening agents.

Processes for preparing polyolefin fibers for manufacturing cigarette filters have been disclosed in the following patents: British Pat. Nos. 2,105,641; and 2,004,729; U.S. Pat. Nos. 4,189,511; 3,396,073; 3,110,642; and 3,226,795; Japanese Pat. No. 28559/70; and West German Pat. No. 2,623,844. Blends of polyolefins with other fibers for cigarette filters are disclosed in U.S. Pat. No. 3,561,361; and Belgian Pat. Nos. 884,968; and 884,967. Blends of polyester and polyamide fibers for cigarette filters are known from West German Pat. No. 2,753,789. Fibers of cellulose acetate for cigarette filters are disclosed in U.S. Pat. Nos. 3,068,837; 3,016,531; 4,411,280; and 3,079,930; and British Pat. No. 2,012,553.

SUMMARY OF THE INVENTION

The method and filter of the present invention overcomes the disadvantages of known filters by providing a polypropylene sliver of multicomponent conjugated fibers. The individual elementary fibers forming the sliver are crimped, having microfissures on their surfaces and micropores on their cross-sections, from which a partially fibrillous structure arises. The formed crimps of the fiber are three-dimensional, with from 5 to 7 crimps per centimeter of length. The final titre of the elementary fibers varies from 1 to 9 dtex. The efficiency of the resulting filters is comparable to the efficiency of cellulose acetate filters, and is superior in efficiency to other known filters.

The claimed filters are substantially lighter than cigarette filters manufactured from regenerated cellulose fibers. Indeed, among all of the polymers used for the preparation of cigarette filter fibers, polypropylene has the lowest specific weight. In addition, there is no transverse shrinkage and longitudinal shrinkage is negligible. During use, the functional efficiency of the filter remains constant.

According to the invention, fibers are produced by spinning at least two polypropylene polymer components which are seperately melted, treated, and seperated. The components are united and meltspun directly in capillaries, with extrusion of the melt through spinneret openings. These steps are followed by withdrawal of the formed fibers from the multicomponent fiber formation site. The polymer components of the formed fiber are situated in parallel side-by-side continuous phases. The position of the center of gravity of the individual components is different from the centre of gravity of the elementary fiber, such that the fibers have a self-crimping ability depending in part on the differing moments of force, along different vectors, created by tension in the fibers during texturing or thermal treatment. The weight ratio of the components can range between 1:3 and 3:1.

The withdrawn fibers are accumulated into slivers in a preparation plant. The resulting sliver contains a bundle of from 3000 to 10,000 multicomponent fibers. The silver is treated with well-known hygienic preparation agents. The microfissures and mircopores are formed during fiber elongation, by withdrawing the bundle of fibers from the spinneret at temperatures ranging from 15 to 70 degrees C. Thermal stabilization of the fibers (relaxation and fixation) is achieved at temperature ranging from 70 to 140 degrees C. The silver is wrapped in paper and cut into filters of appropriate length.

The initial polypropylene components have a logarithmic viscosity index (LVI) within a range of from 100 to 200 ml/g. At least one of the initial polymers should contain a high molecular weight fraction, ranging from 5 to 20% by weight, with an LVI of 400 to 450 ml/g. The polymers contain salts of alkali metals and aliphatic fatty acids, such as calcium or magnesium stearates, etc. These cause bonding of the acid substances resulting from catalytic residues—especially chlorides—and they contribute to the bonding of low oily components in the polymer. A combination of phenolates is used as a hygienically unobjectionable and exceptionally favorable stabilization system, especially at higher temperature, in an amount equivalent to 3% by weight.

The polymers are initially processed at from 230 to 330 degrees C., so that the components may exhibit a difference in their LVI values ranging from 30 to 50 ml/g during intermixing in the spinneret. The lowest LVI must exceed 60 ml/g, and at least one component must have a 5 to 20% high molecular weight fraction with an LVI of 400 to 450 ml/g. The difference in the LVI values of the individual components is adjusted according to the number of crimps desired in the resulting fibers.

The sliver of crimped multicomponent fibers produced according to the invention exhibits a high degree of whiteness without the need for matting or bleaching agents. The fibers, with their microfissure and micropores, have a large surface area which provides for efficient flow of gases through the filter, without any increased resistance to flow in the axial direction, relative to filters known in the art. In addition, the microfissures and micropores capture components produced by burning tobacco. The surface area of the fibers can be increased by providing multicomponent fibers with a Y-shaped profile, as opposed to a round profile.

PREFERRED EMBODIMENTS

The invention is further described below by reference to a number of examples. It will be appreciated by those skilled in the art that these examples are merely illustrative of the compounds and methods disclosed herein, and do not serve to limit the scope of the invention.

The amount of the high molecular weight fraction was determined from integral polydispersion curves obtained by chromatographic fractionation consisting of gradual extraction of the polymer film on an inert carrrier by a mixture of a diluent and a precipitating agent. The diluent is decaline and the precipitating agent is phenyl-beta-naphthylamine. Acetone was used to determine the quantitative separation of the polymer from the eluate. The LVI for the isolated fractions was carried out in accordance with Czechoslovak Standard CSN 61 11 31. in accordance with Czechoslovak Standard CSN 61 11 31.

For all of the examples, the deformation ration is defined by the ratio of fiber velocities:

$$\lambda = (V_2/V_1)$$

Wherein $V_1$ is the velocity of fiber at the inlet into the elogation zone, and $V_2$ is the velocity of fiber at the outlet from the elogation zone.

The fiber forming components are united as melt flows either before or during the processing in a spinneret.

EXAMPLE 1

Two polypropylene polymers were used. The first polymer, with an LVI of 180 ml/g and a 15% fraction with an LVI of 400 ml/g, was melted in an extruder at 280 degrees C. The second polymer, with an LVI of 145 ml/g and an 8% fraction with an LVI of 400 ml/g, was melted in a second extruder at 260 degrees C. The polymers contained 0.15% calcium stearate by weight and 0.2% of the stabilization system. In the spinneret, the difference in LVI values was 35 ml/g, the lower value was 115 ml/g, and the 400 ml/g fraction in the first polymer was 7.5% by weight. The polymer components were dosed in a 1:1 ratio. The bundle of fibers was withdrawn from the spinneret at 15° C. and at a rate of 30 m/min, was then continuously drawn to the deformation ratio of 3.0, and was relaxed and fixed in an electrically heated channel. The drawn sliver contained 8400 elementary fibers with a unit fineness of 6.5 dtex, with 7 crimps per centimeter of length. The sliver was wrapped with cigarette paper and cut into filters of 15 mm length.

EXAMPLE 2

A polypropylene polymer, with an LVI of 160 ml/g and a 10% fraction with an LVI of 445 ml/g, was melted in an extruder at 260 degrees C. The same polymer was seperately melted in a second extruder at 320 degrees C. The two components were united in a spinneret at 260 degrees C., in a ratio of 1:3. The polymers contained 015% calcium stearate by weight and 0.2% of the stabilization system. In the spinneret, the difference in LVI values was 30 ml/g, the LVI of the component melted at 260 degrees C. was 147 ml/g, and the 445 ml/g fraction was 5% by weight. The bundle of fibers was withdrawn from the spinneret at 25° C. and at a rate of 35 m/min, was then continuously drawn to the deformation ratio of 3.2, and was relaxed and fixed in an electrically heated channel. The drawn sliver contained 3400 elementary fibers with a unit fineness of 5.5 dtex, with 5.5 crimps per centimeter of length. The sliver was wrapped with cigarette paper and cut into filters of 11 mm length.

EXAMPLE 3

A polypropylene polymer, with an LVI of 121 ml/g and a 17% fraction with an LVI of 400 ml/g, was ,melted in an extruder at 255 degrees C. The same polymer was seperately melted in a second extruder at 320 degrees C. The two components were united in a spinneret at 255 degrees C., in a ratio of 1:3. The polymers contained 0.15% calcium stearate by weight and 0.2% of the stabilization system. In the spinneret, the difference in LVI values was 43 ml/g, the VLI of the component melted at 255 degrees C. was 152 ml/g, and the 400 ml/g fraction was 5% by weight. The bundle of fibers was withdrawn from the spinneret at 45' C. and at a rate of 40 m/min, was then continuously drawn to the deformation ratio of 2.8, and was relaxed and fixed in an electrically heated channel. The drawn sliver contained 9400 elementary fibers with a unit fineness of 7 dtex, with 6.5 crimps per centimeter of length. The sliver was wrapped with cigarette paper and cut into filters of 20 mm length.

EXAMPLE 4

A polypropylene polymer, with an LVI of 200 ml/g and a 5% fraction with an LVI of 450 ml/g, was melted in an extruder at 260 degrees C. The same polymer was seperately melted in a second extruder at 330 degrees C. The two components were united in a spinneret at 260 degrees C, in a ratio of 1:3. The polymers contained 0.15% calcium stearate by weight and 0.2% of the stabilization system. In the spinneret, the difference in LVI values was 50 ml/g, the LVI of the component melted at 260 degrees C. was 182 ml/g, and the 450 ml/g fraction was 4% by weight. The bundle of fibers was withdrawn from the spinneret at 60° C. and at a rate of 40 m/min, was then continuously drawn to the deformation ratio of 2.8, and was relaxed and fixed at 140 degrees C. The drawn sliver contained 3000 elementary fibers with a unit fineness of 5 dtex, with 5 crimps per centimeter of length. The sliver was wrapped with cigarette paper and cut into filters of 20 mm length.

EXAMPLE 5

A polypropylene polymer, with an LVI of 100 ml/g and a 20% fraction with an LVI of 400 ml/g, was melted in an extruder at 230 degrees C. The same polymer was seperately melted in a second extruder at 300 degrees C. The two components were united in a spinneret at 230 degrees C., in a ratio of 1:3. The polymers contained 0.15% calcium stearate by weight and 0.2% of the stabilization system. In the spinneret, the difference in LVI values was 30 ml/g, and the 400 ml/g fraction was 5% by weight. The bundle of fibers was withdrawn from the spinneret at 70° C. and at a rate of 33 m/min, was then continuously drawn to the deformation ratio of 3.0, and was relaxed and fixed at 70 degrees C. The drawn sliver contained 10,000 elementary fibers with a unit fineness of 7 dtex, with 7 crimps per centimeter of length. The sliver was wrapped with cigarette paper and cut into filters of 15 mm length.

We claim:
1. A cigarette filter material comprising a sliver of crimped polypropylene multicomponent fibers, having microfissures on their surfaces and micropores on their cross-sections, wherein the elementary fibers in the sliver have different centers of gravity, are present in a ratio ranging from 1:3 to 3:1 by weight, have from 5 to 7 crimps per centimeter of length, and have a unit fineness of from 5 to 7 dtex.

* * * * *

UNITED STATES PATENT AND TRADEMARK OFFICE
CERTIFICATE OF CORRECTION

PATENT NO. : 4,546,040

DATED : October 8, 1985

INVENTOR(S) : Rudolf SIMO et al

It is certified that error appears in the above-identified patent and that said Letters Patent are hereby corrected as shown below:

The following inventors were omitted from the letters patent:

Rudolf SIMO, Svit, Czechoslovakia

Stefan BACULAK, Poprad, Czechoslovakia

Signed and Sealed this

Seventeenth Day of June 1986

[SEAL]

*Attest:*

DONALD J. QUIGG

*Attesting Officer*    *Commissioner of Patents and Trademarks*